(12) United States Patent
Santin Navarro et al.

(10) Patent No.: US 11,390,239 B2
(45) Date of Patent: Jul. 19, 2022

(54) AIRBAG, IN PARTICULAR FOR A SIDE CURTAIN AIRBAG SYSTEM, AND VEHICLE SAFETY SYSTEM HAVING SUCH AN AIRBAG

(71) Applicant: Dalphi Metal Espana, S.A., Vigo (ES)

(72) Inventors: Pedro Jose Santin Navarro, Vigo (ES); Jose Miguel Fernandes Oliveira, Braga (PT)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 17/204,282

(22) Filed: Mar. 17, 2021

(65) Prior Publication Data
US 2021/0197750 A1 Jul. 1, 2021

Related U.S. Application Data

(62) Division of application No. 16/311,838, filed as application No. PCT/EP2017/006692 on Jul. 5, 2017, now Pat. No. 10,967,827.

(30) Foreign Application Priority Data

Jul. 7, 2016 (DE) .......................... 102016008241.0

(51) Int. Cl.
| | |
|---|---|
| *B60R 21/232* | (2011.01) |
| *B60R 21/231* | (2011.01) |
| *B60R 21/2342* | (2011.01) |
| *B60R 21/262* | (2011.01) |
| *B60R 21/261* | (2011.01) |

(52) U.S. Cl.
CPC .......... *B60R 21/232* (2013.01); *B60R 21/231* (2013.01); *B60R 21/2342* (2013.01); *B60R 21/23138* (2013.01); *B60R 21/262* (2013.01); *B60R 2021/2615* (2013.01)

(58) Field of Classification Search
CPC . B60R 21/232; B60R 21/2346; B60R 21/262; B60R 2021/2615; B60R 2021/2612
See application file for complete search history.

(56) References Cited

U.S. PATENT DOCUMENTS

| | | | | |
|---|---|---|---|---|
| 6,042,141 | A * | 3/2000 | Welch | B60R 21/232 280/729 |
| 6,334,625 | B1 * | 1/2002 | Pausch | A62C 3/00 280/729 |
| 6,431,590 | B1 | 8/2002 | Bakhsh | |

(Continued)

FOREIGN PATENT DOCUMENTS

| | | |
|---|---|---|
| DE | 102004033012 A1 | 3/2006 |
| DE | 102009050972 A1 | 6/2010 |
| EP | 2441627 A1 * | 4/2012 ........... B60R 21/213 |

*Primary Examiner* — James A English
(74) *Attorney, Agent, or Firm* — Tarolli, Sundheim, Covell & Tummino LLP

(57) ABSTRACT

The invention relates to an airbag (10), especially for a side curtain airbag system (20), comprising an airbag interior (30) which in the deployed state of the airbag (10) defines one single chamber (40), wherein the chamber (40) comprises a gas guiding device (50) by which the chamber (40) is divided into at least one primary filling zone (41) and at least one secondary filling zone (42), as well as to a vehicle safety system equipped with such airbag (10).

10 Claims, 11 Drawing Sheets

(56) References Cited

U.S. PATENT DOCUMENTS

| | | | |
|---|---|---|---|
| 6,450,527 B2 * | 9/2002 | Kobayashi | B60R 21/232 |
| | | | 280/729 |
| 6,802,530 B2 | 10/2004 | Wipasuramonton et al. | |
| 7,350,804 B2 | 4/2008 | Bakhsh et al. | |
| 8,651,517 B1 * | 2/2014 | Aekbote | B60R 21/232 |
| | | | 280/730.2 |
| 8,708,365 B2 | 4/2014 | Fulmer et al. | |
| 9,415,742 B1 | 8/2016 | Sasakura et al. | |
| 2005/0134025 A1 | 6/2005 | Ridella et al. | |
| 2005/0269806 A1 | 12/2005 | Huber et al. | |
| 2008/0012275 A1 | 1/2008 | Pinsenschaum et al. | |
| 2013/0062870 A1 | 3/2013 | Kim et al. | |
| 2014/0028006 A1 | 1/2014 | Webber | |
| 2015/0054265 A1 | 2/2015 | Deng et al. | |
| 2015/0314746 A1 | 11/2015 | Okuhara et al. | |

\* cited by examiner

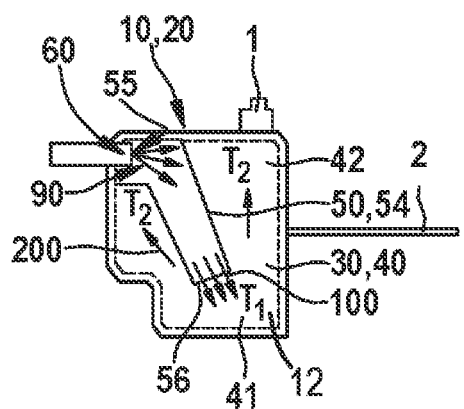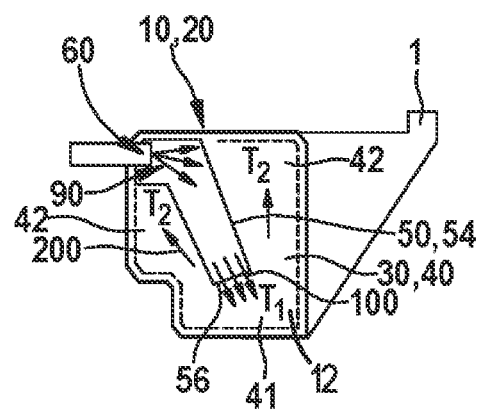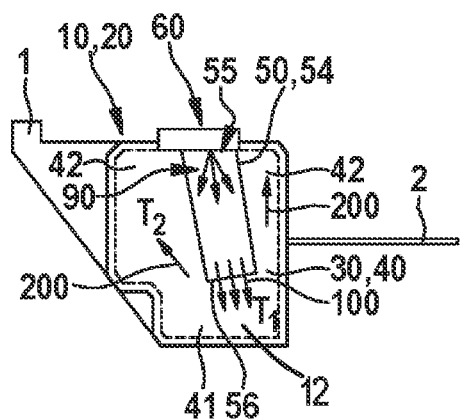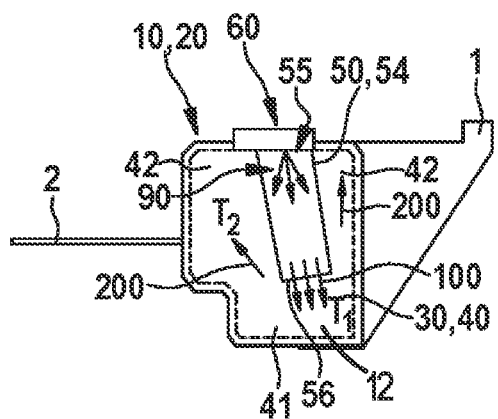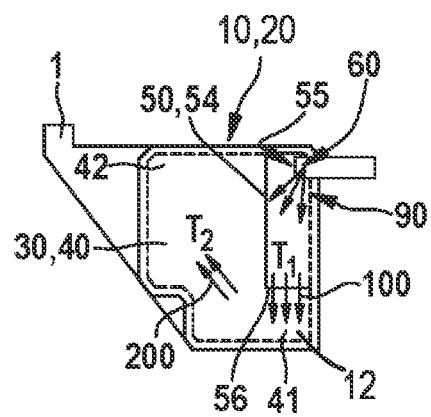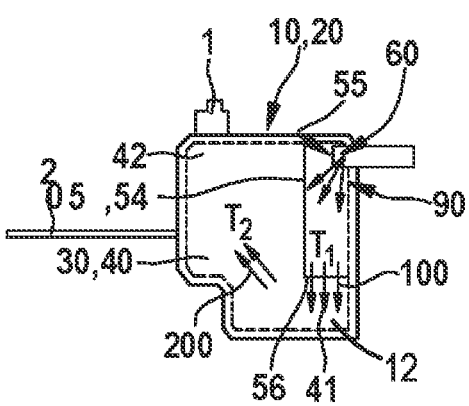

AIRBAG, IN PARTICULAR FOR A SIDE CURTAIN AIRBAG SYSTEM, AND VEHICLE SAFETY SYSTEM HAVING SUCH AN AIRBAG

RELATED APPLICATIONS

This application is a divisional application of U.S. application Ser. No. 16/311,838, filed Dec. 20, 2018, which corresponds to PCT/EP2017/066927, filed Jul. 5, 2017, which claims the benefit of German Application No. 10 2016 008 241.0, filed Jul. 7, 2016, the subject matter of each of which are incorporated herein by reference in their entirety.

BACKGROUND OF THE INVENTION

The invention relates to an airbag, especially for a side curtain airbag system according to the preamble of claim 1, as well as to a vehicle safety system equipped with such airbag according to the preamble of claim 10.

Airbags for airbag systems, especially for side curtain airbag systems, have been known for some time. Airbag systems of this type serve for better protecting occupants of an automotive vehicle in the case of accident. For this purpose, a side curtain airbag system is arranged above a side window and in the case of crash deploys downwards in a curtain-like manner so as to better protect a head and shoulder area of a vehicle occupant against a side impact.

One drawback of these previously known side curtain airbag systems consists in the fact that they do not cover a thorax area of the vehicle occupant and a separate airbag (thorax airbag) has to be provided so as to obtain better protection also in the thorax area.

If the known side curtain airbag system was modified so that it would extend in the vertical direction further downwards, i.e. beyond the shoulder area and into an area on the side of the thorax of a vehicle occupant so as to protect in this way also the thorax area of a vehicle occupant by one airbag only for each vehicle occupant, a new problem would arise, namely a significantly larger airbag volume and, accordingly, the problem of managing a filling of such large airbag exactly in time and to the correct volume. This would be especially difficult, as the airbag is successively filled starting from the inflator provided for filling the airbag and being arranged either in a pillar or in the roof of a vehicle, wherein, according to the construction, at first the "curtain sections" of the airbag located further upwards and more closely to the gas supply are filled and only at last the section located further downwards which is provided for protecting the thorax is filled.

For this reason, in the past also airbag systems were suggested which protected the thorax area of a vehicle occupant with the aid of a second airbag.

However, it is a drawback of those airbag systems and, resp., airbags to fill the different airbag chambers or airbags in a way adapted in time so that the chambers or airbags are correctly filled and correctly positioned at the correct time for ensuring optimum occupant protection.

Airbag systems of this type are described, for example, in WO 2008/011414 A2, U.S. Pat. No. 7,350,804 B2 or US 2005/0134025 A1.

SUMMARY OF THE INVENTION

The object underlying the invention is to provide an airbag (for each vehicle occupant), especially for a side curtain airbag system, as well as a vehicle safety system being equipped with such airbag, while avoiding the aforementioned drawbacks, wherein the airbag volume is filled with gas in terms of time and space such that an optimized occupant protection is ensured.

This object is achieved by an airbag, especially for a side curtain airbag system, according to claim 1 as well as by a vehicle safety system according to claim 10 which is equipped with such airbag.

In particular, the object is achieved by an airbag, especially for a side curtain airbag system, wherein the airbag includes an airbag interior defining one single chamber in the deployed state of the airbag, the chamber having at least one gas guiding device by which the chamber is divided into at least one primary filling zone and at least one secondary filling zone.

It is a major point of the invention that, by way of the gas guiding device arranged inside the volume of the airbag within the airbag interior, a filling of the airbag volume controlled both as to space and as to time is possible starting from a fluid source, especially gas source, such as an inflator. For this purpose, the gas guiding device divides the airbag interior and, resp., the chamber of the airbag forming the airbag interior into at least one primary filling zone and into at least one secondary filling zone.

When gas is supplied into the airbag interior, the gas is thus guided along the gas guiding device first into the primary filling zone. A supply of gas into the secondary filling zone is substantially not carried out before a particular primary filling level is reached.

According to a preferred embodiment of the invention, the primary filling zone(s), i.e. at least one primary filling zone, is/are more distant in the spatial and fluidic respect from the single or at least one gas supply orifice through which gas supply of the airbag may take place, than the secondary filling zone(s) is/are distant from the respective same gas supply orifice.

In this context it is mentioned that the primary filling zone(s) according to a preferred embodiment of the invention is/are associated with the portion of the airbag that is provided for protecting the thorax, while the secondary filling zone(s) is/are associated with the, especially upper, "curtain section" of the airbag.

The gas guiding device according to the invention causes the respective primary filling zone(s) arranged spatially more distant from the gas supply orifice to have a smaller distance from the gas supply orifice in the fluidic respect than the respective secondary filling zone(s) has/have from the respective same gas supply orifice so that during filling the airbag according to the invention at first the primary filling zones and only afterwards the secondary filling zones are filled with gas.

In accordance with a preferred embodiment of the invention, this is effectuated in that the gas guiding device is configured so that it forms a separation, namely a separating device such as a separating wall or a separating seam between the primary filling zones and the secondary filling zones or, respectively, between the primary filling zone and the secondary filling zone.

The gas guiding device and, resp., the separating device is configured to be substantially impervious to gas for this purpose so that upon filling the airbag the gas flowing from the gas supply orifice into the airbag is guided along the separating device into the primary filling zone. The separating device thus delimits the primary filling zone against the secondary filling zone, wherein a complete, especially substantially gas-tight, separation of the two filling zones may be realized or a defined gas-permeable separation of the primary filling zone from the secondary filling zone is given so that a small portion of the inflowing gas along the separating device may flow through the same also into the secondary filling zone so that the latter is filled simultaneously with the primary filling zone, however by a definitely reduced volume flow. The reduced volume flow is within the range of 1% to 20%, preferably within the range of 2% to 15% and especially preferred within the range of 5% to 10%, each related to the inflowing total volume flow of the inflowing filling gas.

In accordance with an embodiment of the invention, the gas guiding device is formed in that at least two inner wall portions of the airbag facing each other and being associated with each other are interconnected directly or by means of a spacer, especially by means of a spacing belt, preferably in a detachable manner. The connection of the inner wall portions of the airbag associated with each other is realized, according to the invention, by means of a seam which may be a glued seam and/or a sealed seam and/or a stitched seam. In the case of use of a spacer, especially a spacer belt, the respective inner wall portions of the airbag are not connected directly but via the spacer belt, wherein the respective longitudinal sides and, resp., longitudinal edges of the spacer belt are again connected by means of a seam, which again may be a glued seam and/or a sealed seam and/or a stitched seam, to the pertaining, i.e. associated, inner wall portions of the airbag.

According to the invention, the spacer belt in turn may be configured to be gas-permeable or to have a defined gas permeability so that during a filling operation of the airbag according to the invention a main volume flow flows in the direction of the primary filling zone and a reduced secondary volume flow flows in the direction of the secondary filling zone. By the degree of gas permeability of the separating device a specific control in terms of time and space of the filling operation of the airbag according to the invention is possible, wherein the gas permeability of the separating device may be different over its length. At this point, also an initial gas permeability of the separating device, which is provided already at the beginning of the filling operation of the airbag, has to be distinguished from initiated gas permeability according to the invention which is resulting, for example, from a widening of pores or holes in the separating device during the filling operation.

In accordance with a preferred embodiment of the invention, the connection of the inner wall portions of the airbag associated with each other which forms the separation between the primary filling zone and the secondary filling zone is designed to be detachable so that the connection is released and, resp., opened upon increase in the internal pressure inside the airbag in the course of filling the airbag, for example, so that gas may flow through this releasing connection, i.e. opening separation, from the gas supply orifice and moreover from the primary filling zone into the secondary filling zone so that now also the secondary filling zone fills substantially completely with filling gas. In the case of using a spacer belt, a longitudinal edge of the belt may remain tightly connected to the associated inner wall of the airbag, while upon breaking of the connection the other longitudinal edge of the belt detaches from the associated inner wall portion of the airbag.

In accordance with the invention, the glued and/or sealed and/or stitched seam may have a different seam resistance. Such different seam resistance may be realized, for example, by a differently broad gluing and/or sealing and/or stitching. Moreover, also differently tight adhesives, sealing materials or yarns may be used. The respective types of connection may also be used in combination with each other and supplementing each other.

In addition, the seam may have at least one weakened portion serving as a predetermined breaking point for the seam. Such weakened portion may be in the form of a pointed seam, for example, which projects into the area of higher pressure during the filling operation of the airbag and peels and/or tears upon reaching a particular minimum pressure. By providing such weakened portion a breaking of the seam can advantageously be exactly controlled, wherein it is possible, for example, to define the point or points of the seam at which a breaking of the seam will be initiated or will start.

According to a further preferred embodiment of the invention, the gas guiding device is formed by a tubing system having at least one inlet opening and at least one outlet opening, the inlet opening being in fluid connection with the at least one gas supply orifice of the airbag and the at least one outlet opening ending in the primary filling zone of the chamber. According to the invention, it is advantageously possible to supply the filling fluid and, resp., gas to the volume of the airbag, i.e. the one or the plural primary filling zone(s) and the one or the plural secondary filling zone(s) through the tubing system so that at first the one or the plural primary filling zone(s) are filled with the filling fluid, as the outlet opening of the tubing system ends in the one or the respective primary filling zone(s) and only afterwards the gas flows via said primary filling zones into the secondary filling zone(s) of the airbag according to the invention and fills the latter.

According to the invention, the tubing system through which the gas is guided may be substantially completely gas-tight or may have a certain permeability for the inflowing gas so that a reduced volume flow may flow out of the tubing system directly into the one or the, possibly selected, secondary filling zone(s), wherein the reduced volume flow is in the range of from 1% to 20%, preferably in the range of from 2% to 15% and especially preferred in the range of from 5% to 10%, in each case related to the total volume flow of the inflowing filling gas.

In this way it is possible to fill both the primary filling zones and the secondary filling zones exactly at the desired time with the respectively desired amount of gas so that a filling targeted in terms of space and time of the airbag takes place.

Moreover, the tubing system may have a weakened point, for example in the form of a seam, which may be a sealed seam and/or a glued seam and/or a stitched seam, so that the tubing system will burst at one or more positions or else substantially completely when a predetermined filling state of the airbag is given. Such filling state of the airbag may be defined, for instance, via a predefined pressure prevailing in the primary filling zone and/or in the secondary filling zone and/or in the tubing system. It is stated in this context that also the airbag wall itself may be designed as part of the tubing system and may form part of the wall of the tubing system, for example.

For the rest, the tubing system may be guided along the inner wall of the airbag and/or be fastened on said inner wall, by means of spacers where necessary.

According to a further embodiment of the invention, the spacer, especially the spacer belt, and/or the tubing system is made substantially of the same material as the airbag.

Further the object according to the invention is achieved also by the use of an airbag for an airbag system, especially a side curtain airbag system, according to the foregoing remarks.

The object according to the invention is further achieved also by a method of filling an airbag, wherein gas is introduced into the airbag starting from a gas supply orifice using a gas guiding device according to the foregoing description, wherein before filling a secondary filling zone at first a primary filling zone is filled at least partly or substantially completely with gas.

In the course of feeding the secondary filling zone with gas, according to the invention, at least one separating device, especially at least one seam will be broken between the primary filling zone and the secondary filling zone of the chamber. The separation is substantially broken so far that the airbag interior in the deployed, i.e. in the substantially completely filled state of the airbag defines one single chamber.

Furthermore, the object according to the invention is also achieved by a vehicle safety system that is equipped with an airbag according to the foregoing description and is fed with gas by the afore-described method for filling such airbag. Such vehicle safety system includes at least one sensor unit for detecting data as well as an electronic decision-making unit which is adapted, while incorporating the data detected by the sensor unit, to define the presence of a trigger case for the airbag module and/or to send a trigger signal to the airbag module.

Summing up, the invention discloses a curtain airbag comprising a thorax protection, wherein the airbag has a specific airbag design according to the invention for quicker targeted and time-optimized deployment so as to optimally position the airbag for ensuring optimized occupant protection, especially in the case of side impact. The substantial aspect of the invention consists in the fact that the side curtain airbag including thorax protection is deployed so that the gas escaping from the propellant and possibly from a gas storage system is initially guided into the part of the airbag which is essential for the thorax protection, i.e. the lower part in the mounted and, resp., deployed state. According to an embodiment of the invention, this is obtained by way of a seam or plural seams and/or a tubing system arranged to be integrated in the airbag and serving as a gas guiding device. The seam or, respectively, the plural seams, is/are configured as regards their strength so that upon a predetermined degree of deployment and of the deployment volume of the airbag they will tear in the thorax area so that the gas may diffuse through the breaking point(s) of the seam also into the remaining volume of the airbag, which is substantially not associated with the thorax area of the airbag, and thus may substantially completely fill the airbag. This concept according to the invention may be applied to airbags having a thorax protection for one or more passenger rows. In accordance with the invention, the newly developed airbag is suited especially for vehicles having up to three rows of seats, with the airbag according to an embodiment of the invention being adapted to extend over all three rows of seats. In this case, it has turned out to be of advantage when the filling of the airbag is carried out substantially centrally with respect to the longitudinal extension of the airbag, i.e. an inflator is arranged substantially in the center of the longitudinal extension of the airbag. Alternatively, the airbag according to the invention may also extend over two passenger rows. Moreover, according to the invention it is possible to use a separate airbag for each seat row which may thus be used also in vehicles having two, three and more rows of seats such as a coach, for example. Especially the concept according to the invention is suited for airbags extending over one or two passenger rows. In this case, according to the invention there is preferred the combined design of an airbag according to the invention which extends jointly over the front seat row and the rear seat row. In this case, the inflator may be arranged either in the A-pillar, or in the B-pillar or C-pillar of the vehicle. According to an alternative embodiment, the use of individual airbags for the protection of the passengers in the front and rear seat rows is possible according to the invention. If the curtain airbag is provided for protecting the rear passengers of a vehicle, the inflator may be arranged, for example, in the C-pillar of the vehicle. Furthermore, the inflator/propellant utilized jointly with the novel airbag according to the invention can also be arranged at an angle, e.g. at an angle of preferably 90°, with respect to the deployment plane of the curtain airbag, i.e. in a roof plane of the vehicle, for example. Consequently, the novel airbag system according to the invention is especially suited for conventional sedans or station wagons having one or two rows of seats, but especially also for MPV, minivans, vans, pickups and coaches as well as trucks.

With the aid of the airbag design according to the invention, it is possible by all variants presented within the scope of this invention to eliminate any previous problems in deploying curtain airbag systems including a thorax protection in which the gas during deployment has been distributed in a non-directed manner starting from the inflator. Furthermore, the airbag design according to the invention offers the important and substantial advantage vis-à-vis previous single- and double-chamber systems for curtain airbags which have been utilized so far to provide a certain thorax protection that the deployment of the airbag according to the invention can be controlled by far better compared to said previous single- and double-chamber systems so that an airbag system equipped with such airbag according to the invention in a vehicle safety system in the case of crash offers protection for vehicle occupants which is definitely improved vis-à-vis conventional airbag systems.

The solution according to the invention is based on the fact that the gas flowing out of the inflator or, resp., propellant at first flows directly into the thorax area of the airbag according to the invention until said thorax area has a particular predetermined degree of deployment. At this time the thorax area of a vehicle occupant is thus protected extremely quickly. When the thorax area of the airbag has reached a predetermined degree of deployment, the seam(s) provided with predetermined breaking points tear(s) and the other areas of the volume of the airbag will fill step-by-step with filling gas in a controlled manner.

Hence it can be exactly defined by the airbag design according to the invention which areas of the airbag are filled with filling gas in which order of time and space.

According to a further variant according to the invention, the gas guiding device cannot only be designed in the form of one seam or plural seams being placed inside the airbag, but such gas guiding device can also be present, as mentioned before, as a tubing system extending inside the airbag and serving for distribution of the filling gas in the airbag. For this purpose, the tubing system is connected, on the one hand, to a gas supply means such as an inflator and, on the other hand, extends with at least one open end into a portion of the airbag provided for the thorax protection. The tubing system for this purpose may have branches, for example to fill the respective airbag areas for the side curtain airbag system, which are provided for several passenger rows, or to fill plural primary filling zones in a portion of the airbag which are associated with only one seat row. In this context, it is also possible to feed a primary filling zone of the airbag according to the invention of two, for instance opposed, airbag portions with filling gas. Equally it is provided according to the invention that in an airbag according to the invention two primary filling zones are provided one of which protects the thorax and another one protects the head area.

Furthermore, the tubing system can be configured so that the filling gas is guided through the tube initially into the respective portions of the airbag provided for the thorax protection and then starting from these portions extends into the residual volume of the airbag. In accordance with a variant according to the invention of such tubing system, the latter may also be formed so that the gas guiding tube tears upon certain deployment of the airbag at one or more positions so that gas can escape from the gas guiding tube and can fill the residual airbag volume. A delimitation of the gas guiding tube may be formed, for example, by one or more seams resulting from the fact that inner walls of the airbag are interconnected in accordance with a gas guiding device. This seam may have predefined seam characteristics and may be configured so that it will burst in the case of a predefined inflating and, resp., deployment volume of the airbag.

An airbag according to the invention thus cannot only be filled in a well-defined manner from the bottom to the top, i.e. in the vertical direction, but also from the front to the back, i.e. in the horizontal direction so that, as desired, a back area of a vehicle occupant or an abdominal area of the vehicle occupant is protected in a specific manner primarily, i.e. more quickly, or secondarily, i.e. subordinately. In this respect, the airbag according to the invention may be selected to be specifically combined for a respective vehicle and its driver with consideration of his/her figure and mounted into the vehicle.

Moreover, the invention relates to an aspect of using an airbag according to the foregoing remarks for an airbag system, especially a side curtain airbag system, as well as a method aspect for filling an airbag, wherein starting from a gas supply orifice gas is introduced into the airbag using a gas guiding device according to the foregoing description, wherein prior to feeding a secondary filling zone at first one or several primary filling zone(s) is/are filled substantially completely with gas.

According to an embodiment of the method, in the course of feeding the secondary filling zone with gas at least one separation, especially at least one seam and/or one tube, is broken between the primary filling zone and the secondary filling zone of the chamber.

According to the invention, the separation is broken so far that the airbag interior defines one single chamber in the deployed, i.e. substantially completely filled state of the airbag.

The advantages of the airbag and, respectively, airbag system according to the invention thus can be summarized as follows. By way of the airbag design according to the invention it is possible to fill a single-, double- or multi-row airbag very quickly so that the thorax area of a vehicle occupant is protected in an extremely rapid manner. The deployment of the airbag according to the invention is more targeted as compared to airbags known from the state of the art, namely in terms of both time and space. Due to the configuration of the airbag according to the invention as a single-chamber system, both the deployment and the filling of the airbag according to the invention is optimized vis-à-vis previously known airbags. If the airbag according to the invention is in the form of a single-row airbag, it is moreover possible to position any number of said airbags, for example in a coach, one behind the other, wherein each of said airbags offers the advantages according to the invention. These include, inter alia, the possibility of using a small inflator which results in a lower weight of the airbag system. This is advantageous especially with respect to previous curtain airbag systems which required a second airbag for a thorax protection.

Further embodiments of the invention will be resulting from the subclaims.

BRIEF DESCRIPTION OF THE DRAWINGS

Hereinafter the invention will be described by way of embodiments which will be explained in detail by way of the pictures, in which:

FIGS. 9a to 9f show a schematic representation of an airbag according to the invention in a sectional view having differently arranged gas supply orifices and inflators according to a further embodiment of the invention.

DESCRIPTION

Figure 1A:
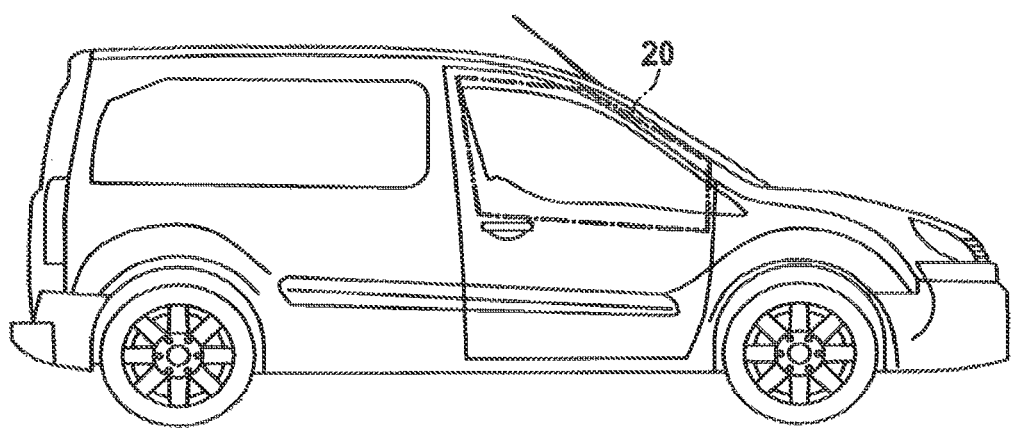
FIGS. 1a to 1d show state-of-the-art airbag systems in a schematic representation.
Figure 1B:
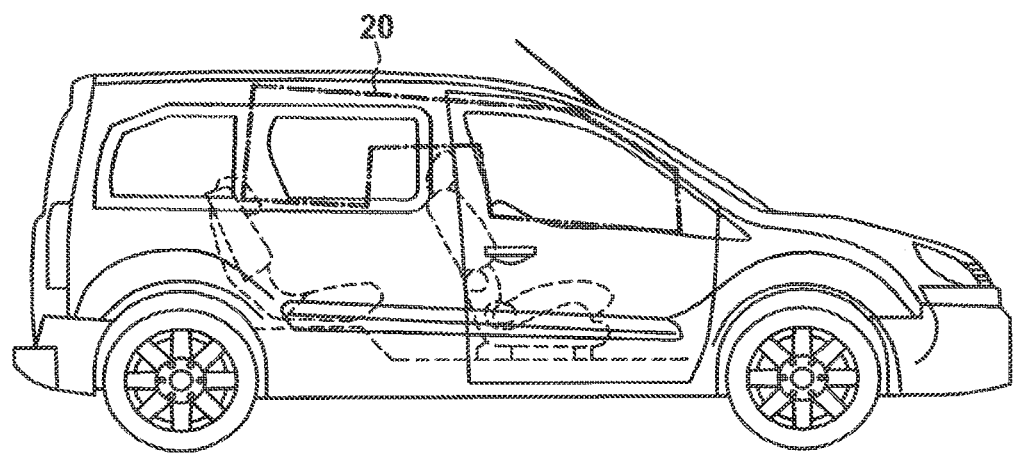
Figure 1C:
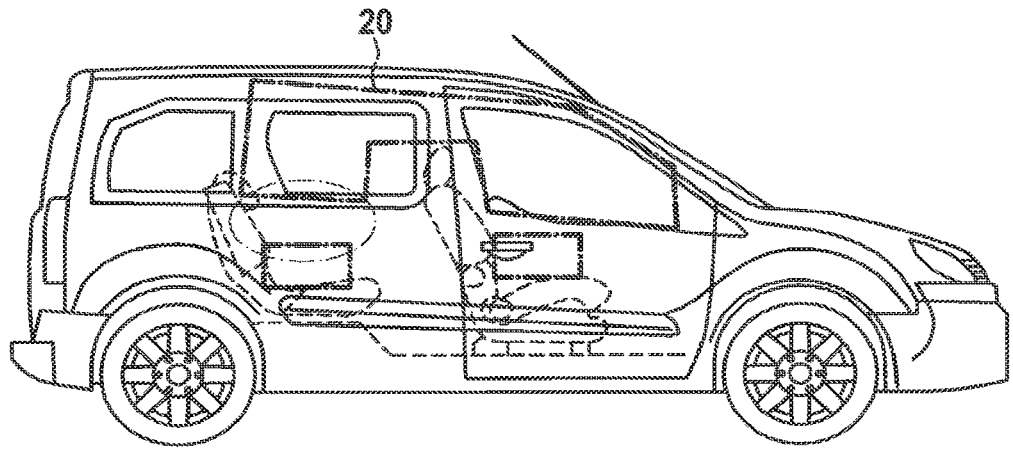
Figure 1D:
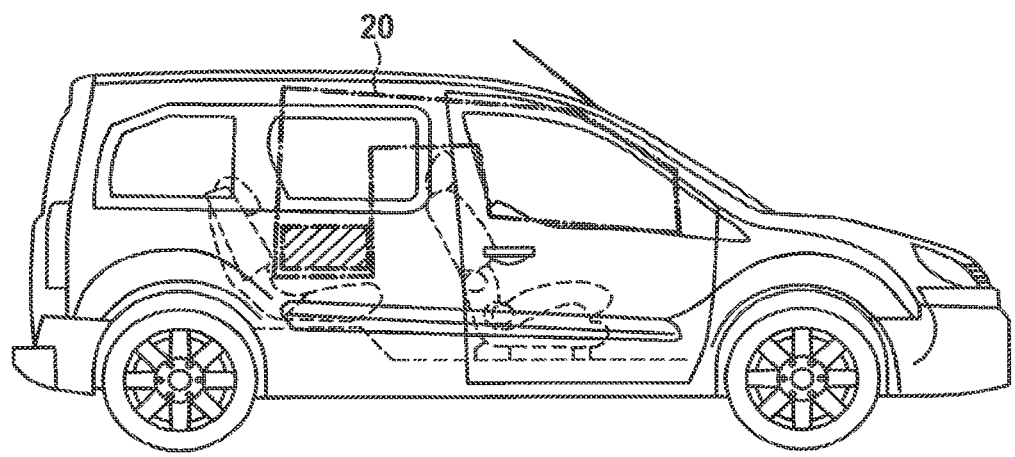

FIGS. 1a to 1d show airbag systems 20 known from the state of the art having no thorax protection or a thorax protection insufficient especially for children. The airbag system 20 according to FIG. 1a is designed merely for the respective front seats, while the airbag system 20 according to FIG. 1b extends over the rear and front seat rows, wherein in both cases no thorax protection is ensured, however, as these side curtain airbag systems 20 do not extend sufficiently far downwards. This applies mutatis mutandis to the side curtain airbag system 20 according to FIG. 1c which, although including a small separate airbag for each of the rear and front seat rows which offers protection for the pelvis and the thighs, again does not ensure any thorax protection. Although the side curtain airbag system 20 according to FIG. 1d known from the state of the art offers thorax protection for the back seats, wherein the part of that airbag system 20 provided for the back seats includes a double-chamber system, also this side curtain airbag system 20 does not exhibit any thorax protection for the respective front seats, however.

The embodiments of FIGS. 2-10F achieve objects of the invention by way of an airbag 10, especially for a side curtain airbag system 20, wherein the airbag includes an airbag interior 30 defining one single chamber 40 in the deployed state of the airbag, the chamber having at least one gas guiding device 50 by which the chamber is divided into at least one primary filling zone 41 and at least one secondary filling zone 42.

In accordance with a preferred embodiment of the invention, this is effectuated in that the gas guiding device 50 is configured so that it forms a separation, namely a separating device such as a separating wall or a separating seam between the primary filling zones 41 and the secondary filling zones 42 or, respectively, between the primary filling zone 41 and the secondary filling zone 42.

The gas guiding device 50 is formed in that at least two inner wall portions 12 of the airbag 10 facing each other and being associated with each other are interconnected directly by a seam 52 or by means of a spacer, especially by means of a spacer belt 53, preferably in a detachable manner.

The connection of the inner wall portions 12 of the airbag 10 associated with each other is realized, according to the invention, by means of the seam 52 which may be a glued seam and/or a sealed seam and/or a stitched seam. In the case of use of the spacer belt 53, the respective inner wall portions 12 of the airbag 10 are not connected directly but via the spacer belt, wherein the respective longitudinal sides and, respectively, longitudinal edges of the spacer belt 53 are again connected by means of seams, which again may be a glued seam and/or a sealed seam and/or a stitched seam, to the pertaining, i.e., associated, inner wall portions of the airbag.

Figure 2:
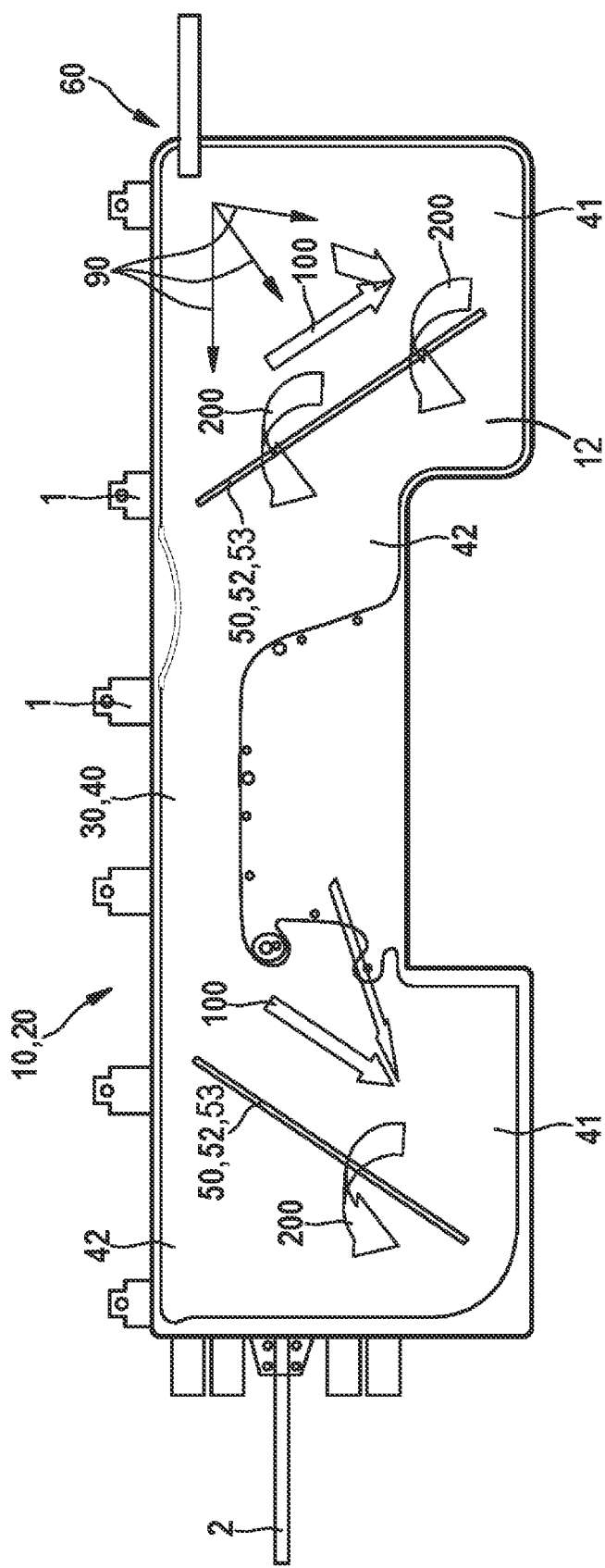
FIG. 2 shows a first embodiment of an airbag according to the invention in a schematic sectional view.

FIG. 2 illustrates a first embodiment of an airbag 10 according to the invention in a schematic sectional view. The airbag 10 comprises an airbag interior 30 including a chamber 40 which is divided into a primary filling zone 41 and a secondary filling zone 42 by a gas guiding device 50 in the form of a seam 52. The airbag 10 includes a gas supply orifice 60 connected to an inflator or any other gas supply means. Through said gas supply orifice 60 filling gas flows into the airbag interior 30 in the operating state of the airbag 10 and spreads along the initial gas flow direction 90 at first non-directed into the gas interior 30, but is guided immediately afterwards by the gas guiding device 50 in the form of a seam 52 along the primary gas flow direction 100 represented as a bold straight arrow into the primary filling zone 41. This primary filling zone 41 deploys, according to the invention, up to a predefined degree, wherein upon reaching such degree and an accompanying predefined deployment volume bursting of the seam 52 is initiated, which seam then tears at least partly or completely and enables a secondary gas flow direction 200 represented as a bold curved arrow along which the secondary filling zones 42 of the airbag 10 are filled. Thus the airbag 10 according to the invention of FIG. 2 is filled at first in its primary filling zone 41 represented at the bottom of the picture. This primary filling zone 41 substantially serves for the protection of a thorax area of a vehicle occupant, but it can also be continued up to the pelvis and thigh area, if desired. As is evident from FIG. 2, that airbag is formed for two seat rows, wherein the gas supply orifice 60 and the inflator are arranged in the rear part of the airbag 10 and are accommodated in the C-pillar of the vehicle.

Figure 3:
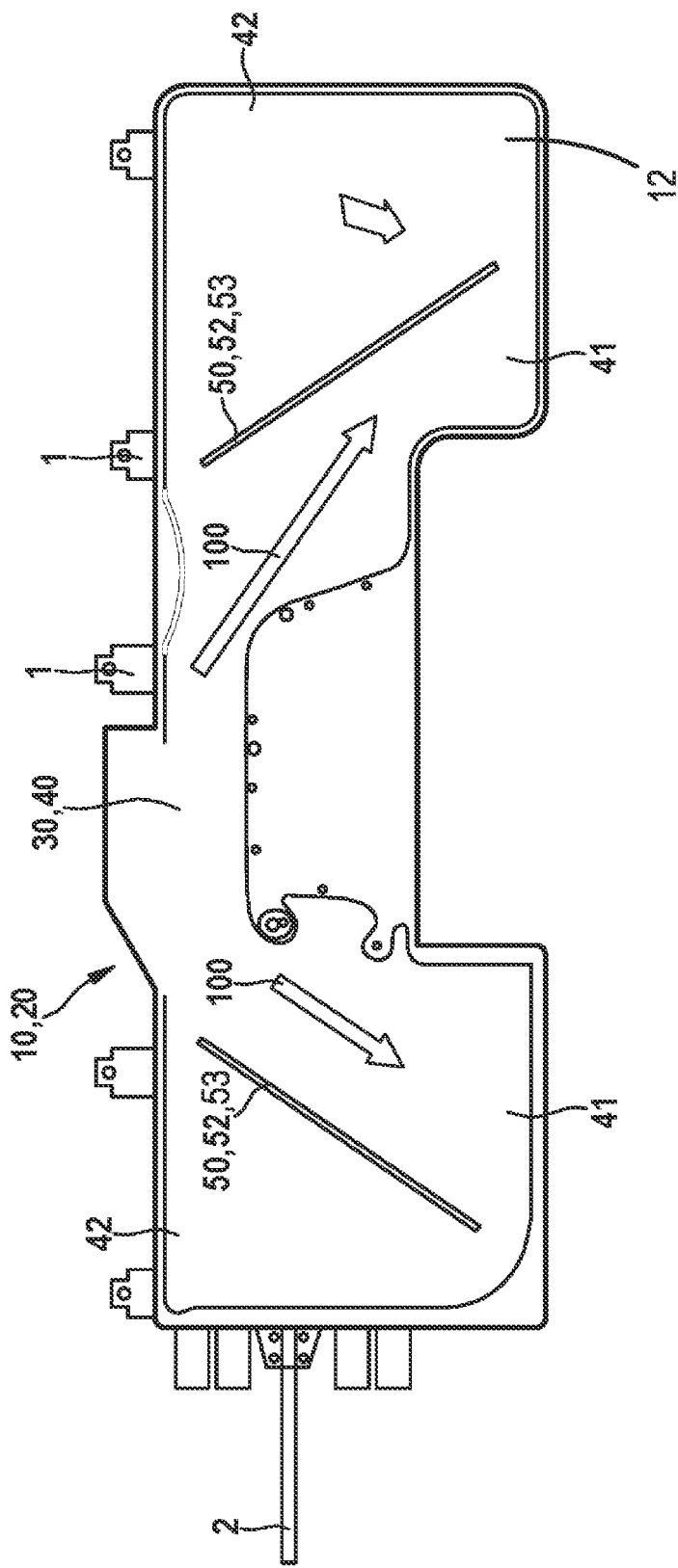
FIG. 3 shows a second embodiment of an airbag according to the invention in a schematic sectional view.

FIG. 3 illustrates a second embodiment of an airbag 10 according to the invention in a schematic sectional view substantially corresponding to the embodiment shown in FIG. 2, with the difference that the airbag 10 according to FIG. 3 is not filled from behind, i.e. starting from the C-pillar of the vehicle, but centrally, i.e. starting from the B-pillar of the vehicle, with filling gas. This embodiment offers the advantage of filling gas being adapted to flow uniformly into the portion of the airbag 10 associated with the front seat row and the rear seat row due to gas entry in the central area of the airbag 10. According to FIG. 3, too, the filling gas initially flows along a primary gas flow direction 100 first into a primary filling zone 41 of the airbag interior 30, which again and corresponding to FIG. 2 is designed as one single chamber, and only after bursting of the gas guiding device 50 in the form of a seam 52 it flows into the secondary filling zone 42.

Figure 4:
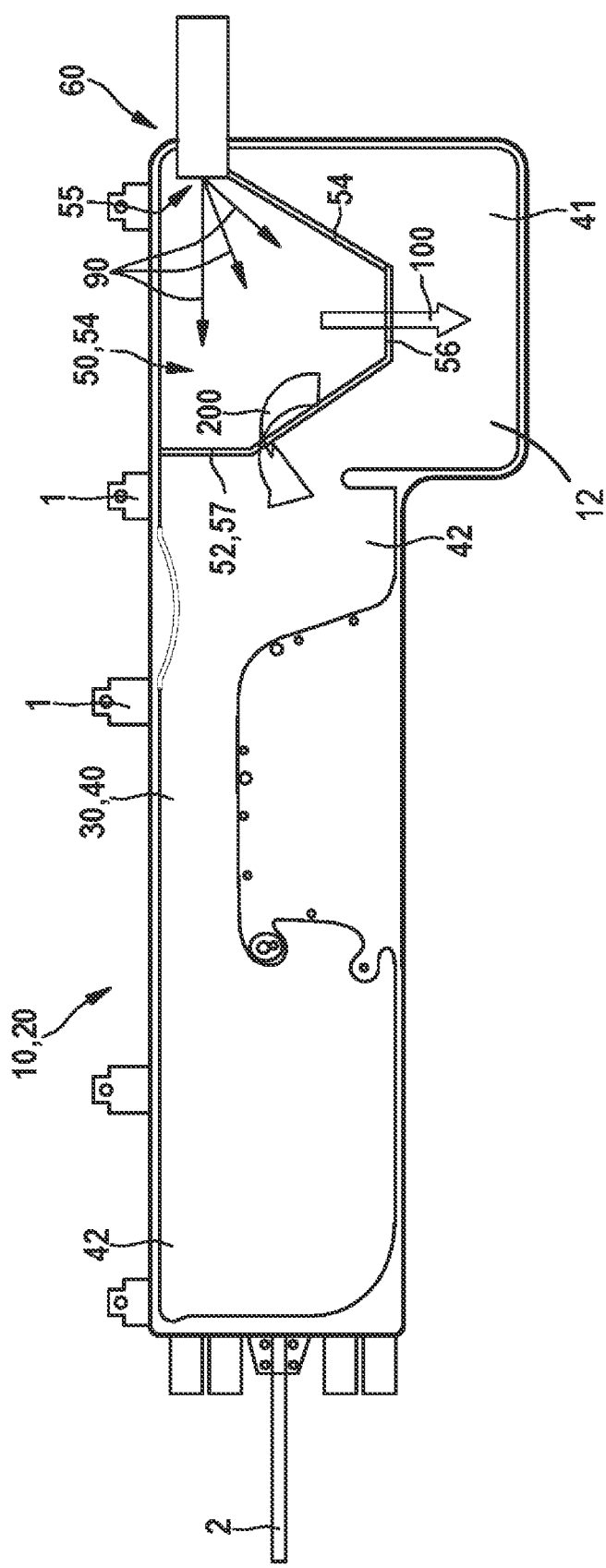
FIG. 4 shows a third embodiment of an airbag according to the invention in a schematic sectional view.

FIG. 4 shows a third embodiment of an airbag 10 according to the invention in a schematic sectional view, wherein the gas supply orifice 60 is arranged again in the rear area of the airbag 10. In this context, it is emphasized that the gas supply orifice 60 basically cannot only be arranged in the rear area of the airbag 10 and, resp., in the central area of the airbag, but on principle may also be arranged in the front area of the airbag 10, namely whenever the inflator and, resp., the gas supply means, is not intended to be provided in the C-pillar or the B-pillar but in the A-pillar of the vehicle. It is basically also possible to accommodate the inflator in the roof area of the vehicle and to design a gas supply orifice 60 on the airbag according to the invention corresponding to the desired arrangement of the inflator.

According to FIG. 4, the filling gas flows along an initial gas admission direction 90 through the gas supply orifice 60 into the airbag interior 30 which is in the form of one single chamber 40. The gas initially enters into a tubing system 54 which is formed by providing, on the one hand, a tube section of the tubing system 54 tightly arranged on the inlet opening 55 for the filling gas which interacts with a seam 52 interconnecting the inner wall sides of the chamber 40 of the airbag interior 30. The interaction between the tube section and the seam 52 results in a tubing system 54 which at its lower end includes an outlet opening 56 through which the filling gas may flow, upon filling the side curtain airbag system 20, along a primary gas flow direction 100 into the primary filling zone 41 of the airbag 10. After the primary filling zone 41 of the airbag 10 has widened and deployed up to a predefined degree, the seam 52 bursts along the predetermined breaking point 57 and enables the filling gas to flow along the secondary gas flow direction 200 into the secondary filling zone 42 of the airbag 10.

Figure 5:
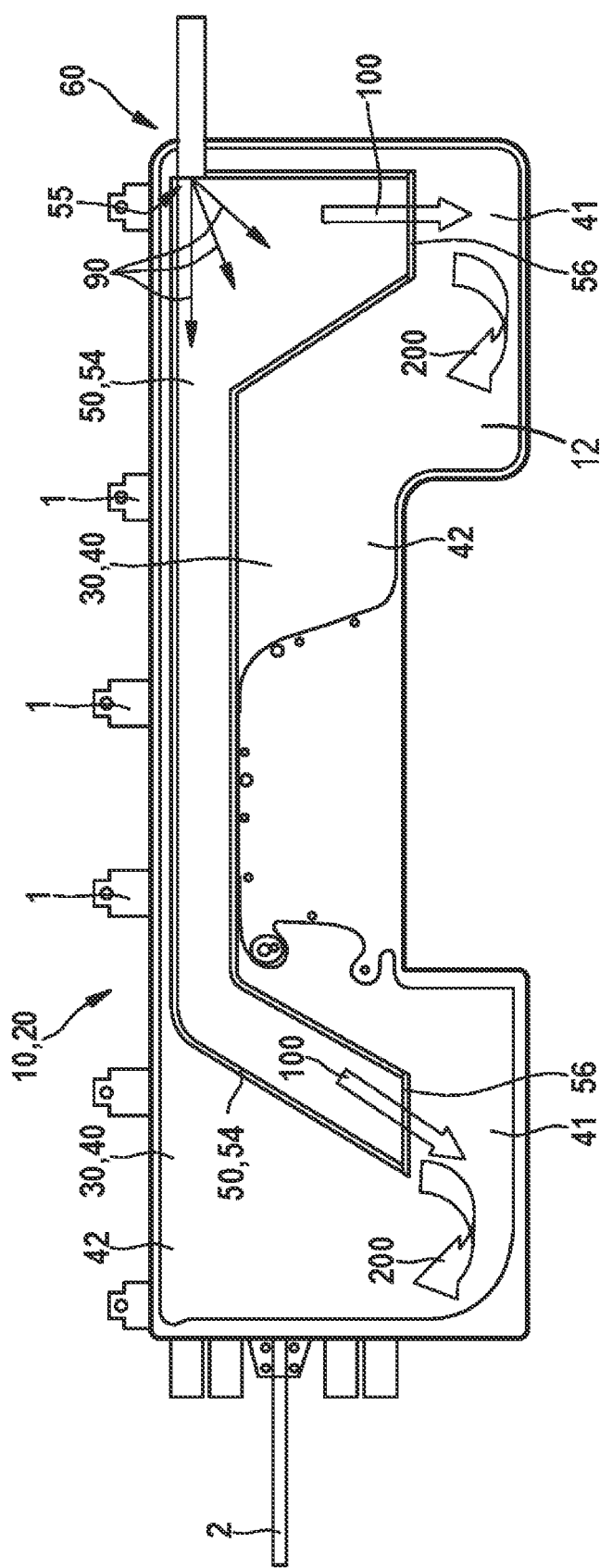
FIG. 5 shows a fourth embodiment of an airbag according to the invention in a schematic sectional view.

FIG. 5 illustrates a fourth embodiment of an airbag 10 according to the invention in a schematic side view, wherein again a gas supply orifice 60 connected to an inflator is provided in the rear part of the airbag 10. Through the gas supply orifice 60 gas flows along an initial gas flow direction 90 through an inlet opening 55 into a tubing system 54 which extends in the interior 30 of the airbag 10. The airbag 10 according to FIG. 5 is an airbag for two seat rows. According to FIG. 5, the tubing system 54 extends starting from the inlet opening 55 into the thorax protection zone for each of the front and rear seat rows and there includes respective outlet openings 56 through which the filling gas can flow along a primary gas flow direction 100 into the respective primary filling zone 41. After the filling gas has escaped from the respective outlet opening 56, the filling gas initially spreads in the primary filling zone 41 and from there subsequently flows into the secondary filling zone 42 of the side curtain airbag system 20.

Figure 6:
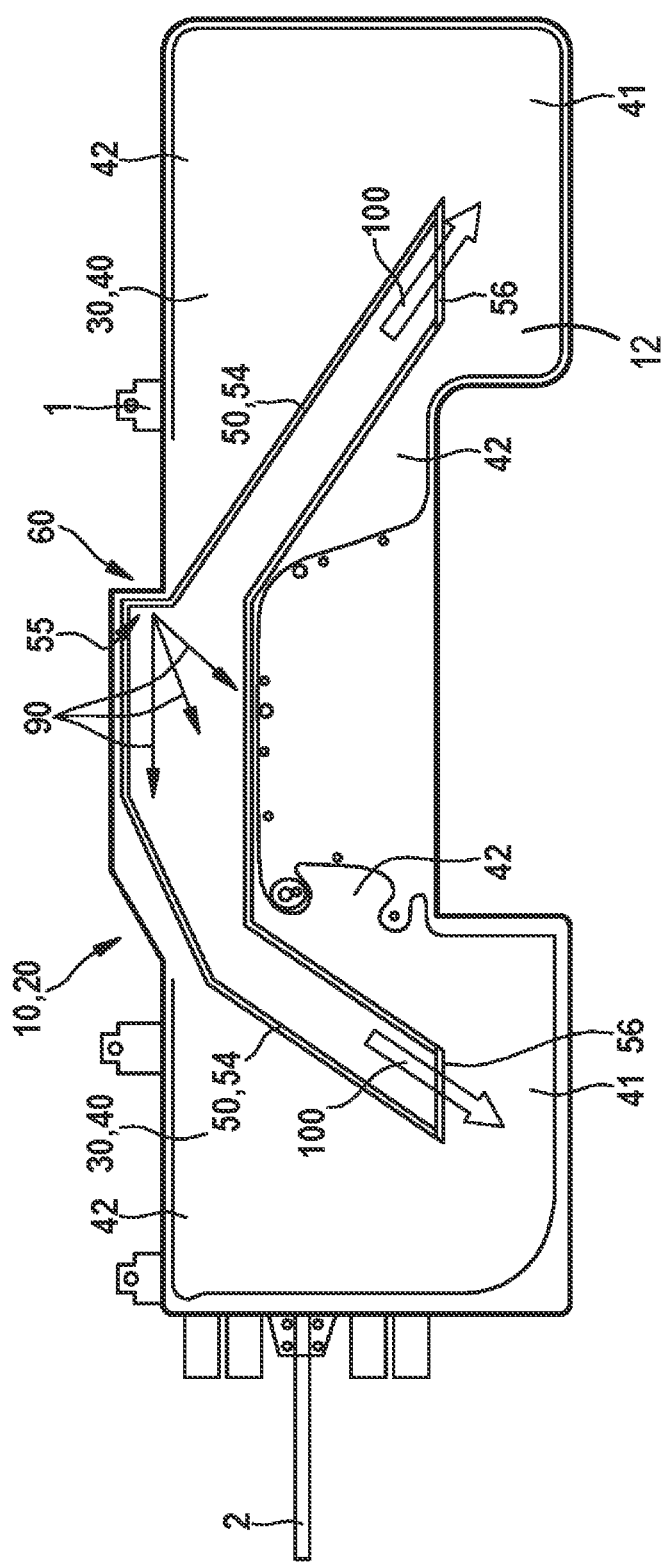
FIG. 6 shows a fifth embodiment of an airbag according to the invention in a schematic sectional view.

FIG. 6 shows another, i.e. fifth embodiment of an airbag 10 according to the invention in a schematic sectional view, wherein a tubing system 54 is provided through which filling gas is guided from an inlet opening 55 to two respective outlet openings 56 in the respective primary filling zones 41 of the airbag 10 which are associated with a respective thorax protection zone for a front and a rear seat row of the side curtain airbag system 20. Also in this case, the filling gas initially flows through the outlet openings 56 into the respective primary filling zone 41 and only afterwards, i.e. only after the primary filling zone 41 has been filled at least partly, into the secondary filling zone 42 of the airbag 10.

Each of the airbags 10 schematically shown in FIGS. 7a to 10f are formed as single-row airbags 10, wherein the respective pictures inter alia differ by the fact that the schematically shown airbags 10 designated with a and b in the pictures include a gas supply orifice 60 which in the driving and mounting direction is formed and arranged at the front, whereas the airbags 10 designated with the letters c and d include a gas supply orifice 60 which in the driving and mounting direction is formed and arranged centrally, and the airbags 10 designated with the letters e and f include a gas supply orifice 60 which in the driving and mounting direction is formed on the rear side. An inflator is associated with each of the gas supply orifices 60.

According to FIGS. 7a to 10f, the filling gas flows along an initial gas admission direction 90 through the gas supply orifice 60 into the airbag interior 30 which is in the form of one single chamber 40.

Figure 7A:
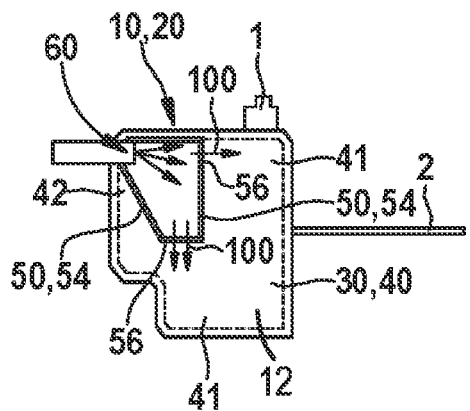
FIGS. 7a to 7f show a schematic representation of an airbag according to the invention in a sectional view having differently arranged gas supply orifices and inflators in accordance with a further embodiment of the invention.
Figure 7B:
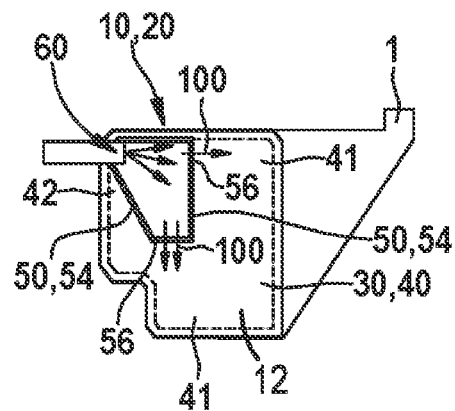
Figure 7C:
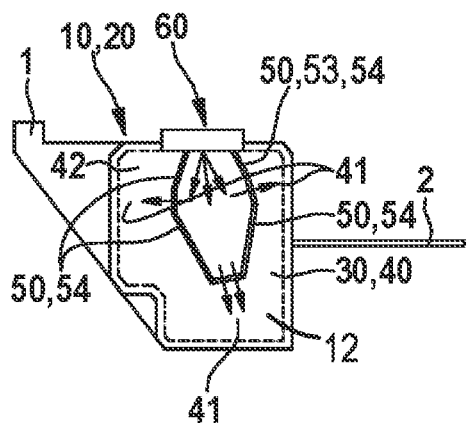
Figure 7D:
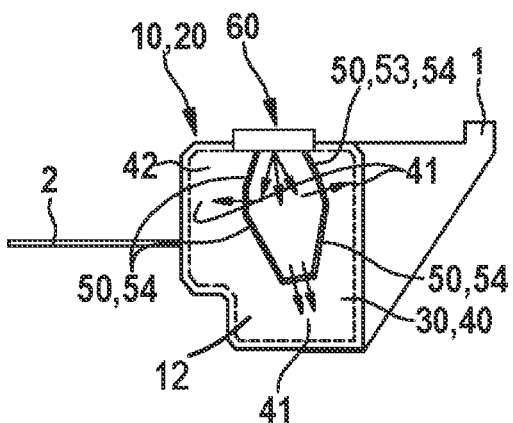
Figure 7E:
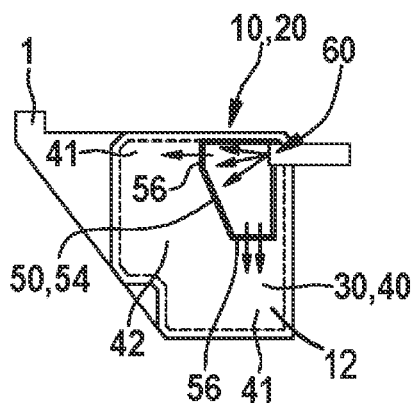
Figure 7F:
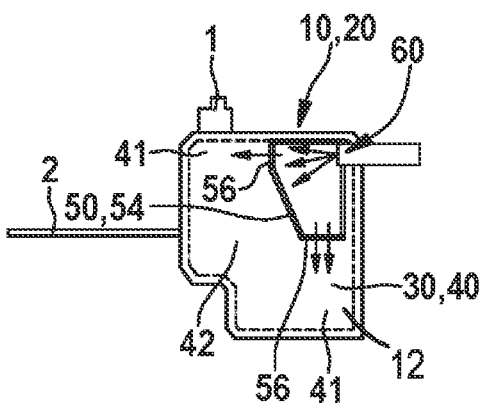
Figure 8A:
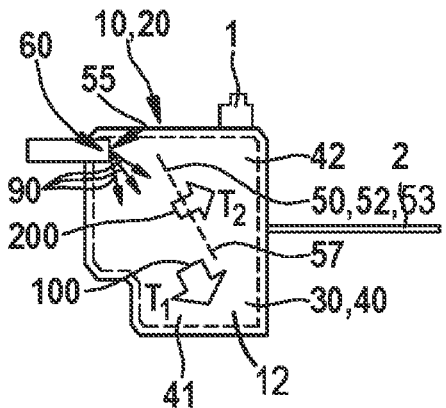
FIGS. 8a to 8f show a schematic representation of an airbag according to the invention in a sectional view having differently arranged gas supply orifices and inflators according to a further embodiment of the invention.
Figure 8B:
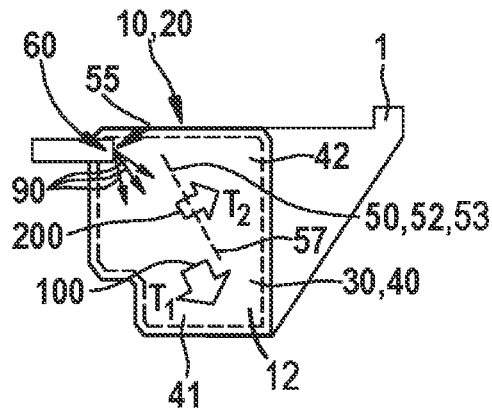
Figure 8C:
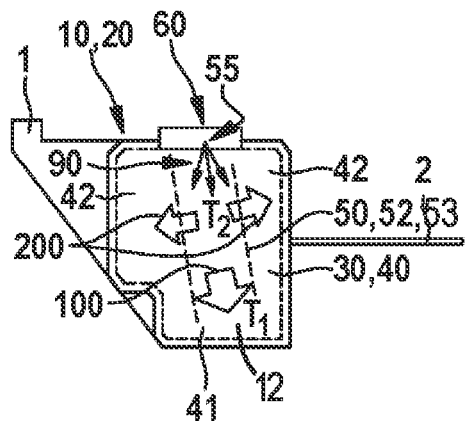
Figure 8D:
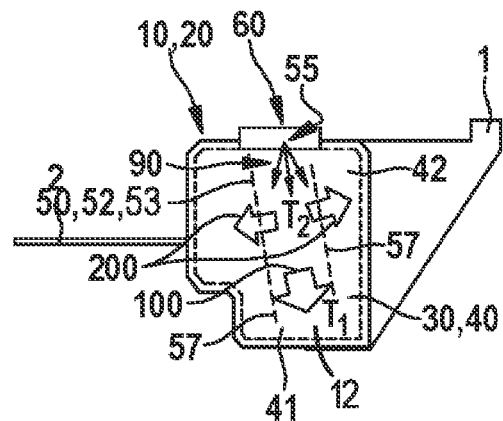
Figure 8E:
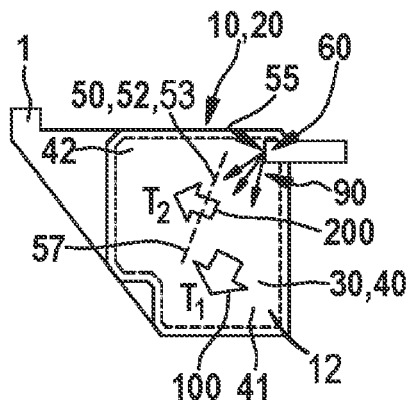
Figure 8F:
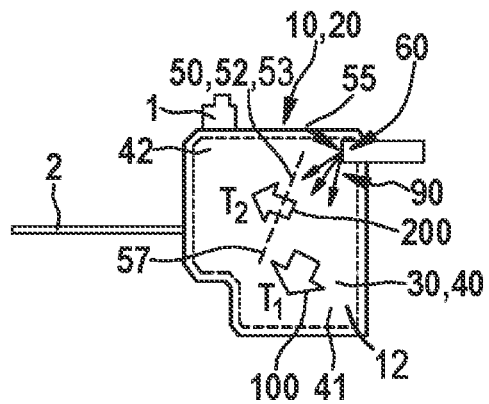
Figure 10A:
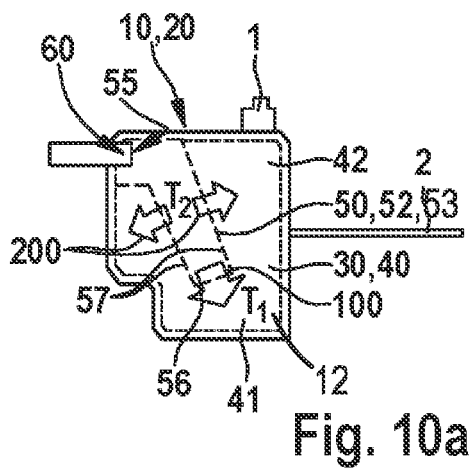
FIGS. 10a to 10f show a schematic representation of an airbag according to the invention in a sectional view having differently arranged gas supply orifices and inflators according to a further embodiment of the invention.
Figure 10B:
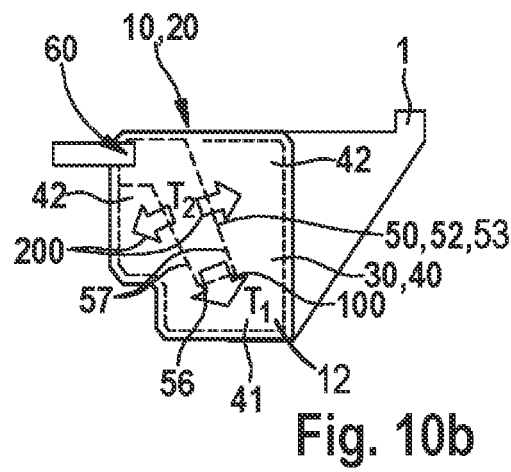
Figure 10C:
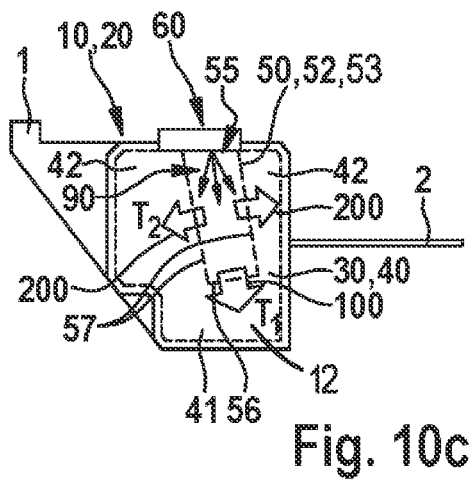
Figure 10D:
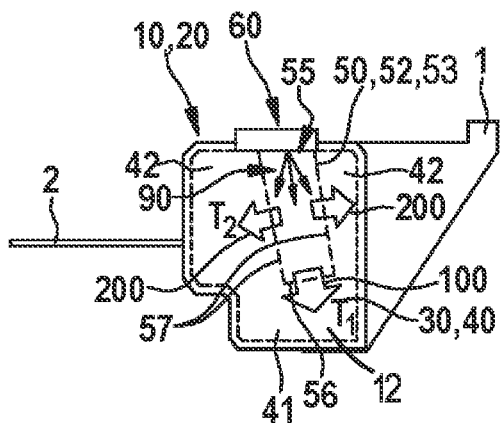
Figure 10E:
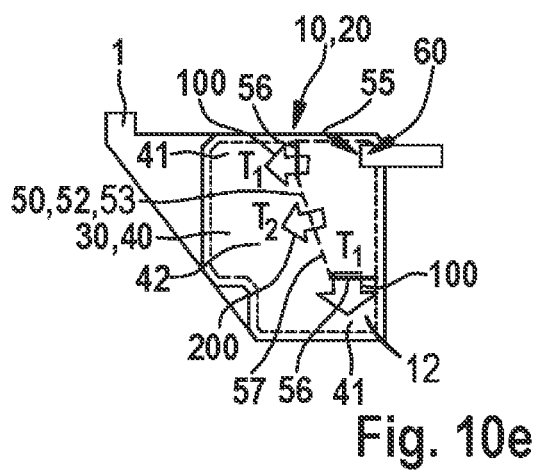
Figure 10F:
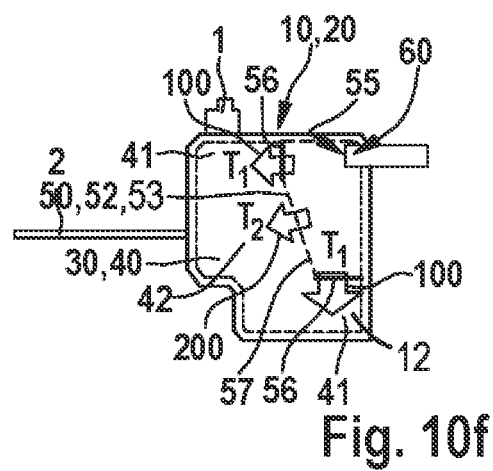

In each of the FIGS. 7a to 7f an airbag according to the invention is shown in a respective schematic sectional view, wherein filling gas flows through a gas supply orifice 60 into a tubing system 54 arranged within the airbag 10 that serves as a gas guiding device 50. According to FIGS. 7a, 7b, 7e and 7f, the tubing system 54 includes two outlet openings 56 through which in the operating state, i.e. during a filling operation of the airbag 10, the filling gas flows initially into two primary filling zones 41 associated with the thorax area and the head area so that, in a case of crash, first the thorax area as well as the head area of a vehicle occupant are protected. In the case of a central filling of the airbag 10 according to the invention, as schematically shown in FIG. 7c and FIG. 7d, the tubing system 54 arranged in the airbag 10 includes a total of three outlet openings 56 through which the filling gas can initially flow into the primary filling zones 41 of the airbag 10 according to the invention. A filling of the secondary filling zones 42 does not take place before the filling gas has flown along the primary gas flow direction 100 into the primary filling zone 41 and from there outpours into the secondary filling zones 42.

The embodiment of an airbag according to the invention shown in FIGS. 9a to 9f substantially differs from the embodiment shown in FIGS. 7a to 7f in that the airbag according to the invention as illustrated in FIGS. 9a to 9f includes a tubing system 54 which has only one single outlet opening 56 which is associated with the primary filling zone 41 and with the thorax area. According to this embodiment, the filling gas flows from the gas supply orifice 60 into the tubing system 54 and leaves the latter along a primary gas flow direction 100 through the outlet opening 56, wherein the first filling zone 41 of the airbag 10 is inflated and thus deployed. After the fill volume of the airbag 10 has reached a predefined level in the first filling zone 41, the filling gas flows into the secondary filling zone(s) 42 along a secondary gas flow direction 200.

According to FIGS. 8a to 8f, the airbag 10 according to the invention includes a gas guiding device 50 which in the case of front-side or rear-side filling is configured as a seam 52 and in the case of central filling is configured as two seams 52 defining a channel. Along the gas guiding device 50 the flowing filling gas is guided along a primary gas flow direction 100 first into the first filling zone 41, until the latter has a predetermined fill volume as well as a predetermined pressure. Upon reaching said fill volume and/or the predetermined pressure, the gas guiding device 50 in the form of a seam 52 will tear so that the filling gas can flow along the secondary gas flow direction 200 into the secondary filling zone 42. In this way, the filling gas inflowing from the gas supply orifice 60 at first along an undefined initial gas admission direction 90 does not spread in the airbag 10 according to the invention in a non-directed and turbulent manner, as in the previous state of the art, but flows along the gas guiding device 50 in a directed manner first into the primary filling zone 41 and only afterwards into the secondary filling zone 41. As is indicated in FIGS. 8a to 8f by the hatched seam 52, according to the invention the seam 52 is not designed to be completely gas-tight but permits a minor gas passage, when the outflowing filling gas flows along the gas guiding device 50. In this way, the secondary filling zone 42 can slightly deploy already before the seam 52 bursts, which, on the one hand, contributes to improved deployment of the curtain airbag per se as well as to controlled inflation of the secondary filling zone 42 after filling the first filling zone 41.

In FIGS. 10a to 10f another embodiment of an airbag 10 according to the invention is illustrated in a schematic sectional view in which the filling gas coming from the gas supply orifice 60 flows into a tubing system 54 formed of seams 52 that may burst at a predefined pressure. In accordance with the embodiments shown in FIGS. 10a to 10f it is illustrated in which way a tubing system 54 can be formed of seams 52, wherein the tubing system 54 will tear from a particular fill volume of the airbag 10 and, resp., of the primary filling zone thereof by bursting of the seams 52 so that the inflowing filling gas then does not only flow along a primary gas flow direction 100 through the outlet opening 56 but also outpours through the burst seams 52 into the secondary filling zone(s) 42. The respective gas flow directions are schematically indicated in FIGS. 7a to 10f by respective arrows.

Each of the airbags 10 according to the invention schematically represented in FIGS. 2 to 10f is provided with module fastenings 1 and a strap or belt 2 which serve for mounting the respective airbags 10 on or in a vehicle.

It is pointed out in this context that all afore-described parts considered per se and in any combination, especially the details shown in the drawings, are claimed to be essential to the invention. Modifications of the same are known to those skilled in the art.

LIST OF REFERENCE NUMERALS 1 module fastening
2 strap or belt
10 airbag
20 side curtain airbag system
30 airbag interior
40 chamber
41 primary filling zone
42 secondary filling zone
50 gas guiding device
52 seam 54 tubing system
55 inlet opening
56 outlet opening
57 predetermined breaking point
60 gas supply orifice
90 initial gas admission direction
100 primary gas flow direction
200 secondary gas flow direction Having described the invention, the following is claimed:

1. A curtain airbag for a vehicle, comprising:
overlying airbag panels configured to define a single inflatable chamber, the chamber comprising a first longitudinal portion configured to protect a first occupant seated in the vehicle, and a second longitudinal portion extending in a longitudinal direction from the first longitudinal portion and configured to protect a second occupant seated in the vehicle in a different row than the first occupant; and
a gas guiding device that defines in the first longitudinal portion of the chamber a lower primary filling zone and an upper secondary filling zone, wherein the secondary filling zone is configured for head protection when inflated and deployed, and the primary filling zone is configured for thorax protection when inflated and deployed;
wherein the first longitudinal portion is configured so that the primary filling zone has a lower extent in the vehicle than a lowermost extent of the second longitudinal portion,
wherein the gas guiding device is configured to arrange the primary filling zone spatially more distant from a gas supply orifice than the secondary filling zone and fluidly less distant from the gas supply orifice than the secondary filling zone, and to guide gas supplied into the chamber first into the primary filling zone for thorax protection, and thereafter into the secondary filling zone for head protection once the gas supplied into the primary filling zone reaches a primary filling level.

2. The curtain airbag of claim 1, wherein during filling of the curtain airbag, the primary filling zone is filled with gas before the secondary filling zone.

3. The curtain airbag of claim 1, wherein the gas guiding device comprises at least one of a glued seam, sealed seam, and a stitched seam, and wherein the at least one of a glued seam, sealed seam, and stitched seam have different seam resistances along their lengths.

4. The curtain airbag of claim 3, wherein the at least one of a glued seam, sealed seam, and stitched seam has a rupturable portion that is configured to rupture once the curtain airbag reaches a predefined pressure.

5. The curtain airbag of claim 1, wherein the gas guiding device comprises a channel having an inlet opening and an outlet opening, the inlet opening being in fluid connection with a gas supply orifice of the curtain airbag, the outlet opening ending in the primary filling zone.

6. The curtain airbag of claim 1, further comprising a gas supply orifice arranged centrally with respect to a longitudinal extent of the curtain airbag.

7. A vehicle safety system, comprising:
the curtain airbag of claim 1;
at least one sensor unit for detecting data; and
an electronic decision-making unit which is adapted, while incorporating the data detected by the sensor unit, to define the presence of a trigger case for inflating the curtain airbag and/or to send a trigger signal for inflating the curtain airbag.

8. The curtain airbag of claim 1, wherein the curtain airbag has a greater length in a vertical direction at the first longitudinal portion than at any other longitudinal portion of the curtain airbag, the vertical direction being perpendicular to the longitudinal direction.

9. The curtain airbag of claim 1, wherein the primary filling zone has a length in the longitudinal direction that is less than the a length of an entirety of the curtain airbag.

10. The curtain airbag of claim 1, wherein the primary filling zone of the first longitudinal portion does not extend into the second longitudinal portion.

* * * * *